(12) United States Patent
Syrjarinne et al.

(10) Patent No.: US 6,771,211 B2
(45) Date of Patent: Aug. 3, 2004

(54) METHOD, SYSTEM AND DEVICES FOR POSITIONING A RECEIVER

(75) Inventors: Jari Syrjarinne, Tampere (FI); Harri Valio, Kammenniemi (FI); Ilkka Kontola, Julkujarvi (FI)

(73) Assignee: Nokia Corporation, Espoo (FI)

(*) Notice: Subject to any disclaimer, the term of this patent is extended or adjusted under 35 U.S.C. 154(b) by 99 days.

(21) Appl. No.: 10/012,061

(22) Filed: Nov. 13, 2001

(65) Prior Publication Data

US 2003/0090413 A1 May 15, 2003

(51) Int. Cl.[7] .............................. G01S 5/02; H04B 7/185
(52) U.S. Cl. ................................................ 342/357.05
(58) Field of Search ........................ 342/357.05, 357.15

(56) References Cited

U.S. PATENT DOCUMENTS 6,297,770 B1 * 10/2001 Ueda et al. ............. 342/357.12
6,317,077 B1 * 11/2001 Soleimani et al. ...... 342/357.05
6,400,314 B1 * 6/2002 Krasner ................. 342/357.09

OTHER PUBLICATIONS

"The Modernized L2 Civil Signal; Leaping Forward in the 21st Century", Fontana et al., GPS World, 2001.
"The New L2 Civil Signal", Fontana et al.
"Global Positioning System: Theory and Applications", B. W. Parkinson, AIAA Inc., vol. 1, 1996, relevant pp. 8–9.
"A Doppler Based Navigation Algorithm", Progri et al., in Proc. ION 2001 National Technical Meeting.
"Understanding GPS: Principles and Applications", E.D. Kaplan, Artech House Inc., 1996, relevant pp. 12–13.
"Global Positioning System Overview", Peter H. Dana.

* cited by examiner

Primary Examiner—Theodore M. Blum
(74) Attorney, Agent, or Firm—Perman & Green, LLP

(57) ABSTRACT

The invention relates to a method for positioning a receiver receiving code modulated signals transmitted by satellites and formed by an individual code for each satellite. In order to provide a reliable reference position for the receiver, it is proposed that in a first step, a reference position for said receiver is calculated based on frequency measurements of said code modulated signals. This reference position can then be employed in a second step for determining the accurate position of the receiver. The invention equally relates to such a receiver, to positioning means, to a computing server and to a positioning system comprising means for realizing the proposed method.

15 Claims, 2 Drawing Sheets

METHOD, SYSTEM AND DEVICES FOR POSITIONING A RECEIVER

FIELD OF THE INVENTION

The invention relates to a method for positioning a receiver based on code modulated signals transmitted by satellites and formed by an individual code for each satellite. The invention equally relates to such a receiver, to positioning means, to a computing server and to a positioning system.

BACKGROUND OF THE INVENTION

A known positioning system which is based on the evaluation of signals transmitted by satellites is GPS (Global Positioning System). The usual constellation in GPS consists of 24 satellites that orbit the earth in 12 hours. This constellation provides between five and eight satellites visible from any point on the earth.

Each of the satellites, which are also called space vehicles (SV), transmits two microwave carrier signals. One of these carrier signals L1 has a carrier frequency of 1575.42 MHz and is employed for carrying a navigation message and code signals of a standard positioning service (SPS). The L1 carrier phase is modulated by each satellite with a different C/A (Coarse Acquisition) Code, as which a Gold code is used. Thus, different channels are obtained for the transmission by the different satellites. The C/A code is a 1 MHz Pseudo Random Noise (PRN) Code and is spreading the spectrum over a 1 MHz bandwidth. The C/A code repeats every 1023 bits, the epoch of the code being 1 ms. The carrier frequency of the L1 signal is further modulated with navigation information at a bit rate of 50 bit/s, which information comprises ephemeris data, data on clock corrections, and other system parameters. Ephemeris parameters describe short sections of the orbit or the respective satellite. The ephemeris parameters can be used with an algorithm that computes the position of the satellite for any time within the period of the orbit described by the ephemeris parameters.

Receiving means of a receiver of which the position is to be determined, receive the signals transmitted by the currently available satellites. The information in the received signals enables positioning means connected to the receiving means to compute the distance to several satellites and thus the current position of the receiver. The computed distance between a specific satellite and a receiver is called pseudorange, because the time is not accurately known in the receiver. The pseudo range can be computed based on the reciprocal pseudo propagation delay of signals from the respective satellite. The receiver is located at an intersection of the pseudo-ranges from a set of satellites. In order to be able to compute positions in three dimensions and the time offset in the receiver clock, the signals from four different GPS satellite signals are required.

Receiving means and positioning means can be comprised in a single, autonomous electronic device constituting a receiver. Alternatively, the positioning means can be external to the receiver. The receiver can for example have access to a cellular network with positioning means. The receiver then only has to transmit the received data to the network, where the positioning calculations are carried out.

The employed modulation technique enables the receiver to distinguish between the signals transmitted by the different satellites and thus to extract the included information, even though the satellites use the same carrier frequency. To this end, the receiver has to synchronize with the respective channel employed by a satellite, i.e. to detect and track the C/A code in the signal.

For detecting and tracking a code of a received signal, GPS receivers usually use a correlation method by which the codes in received signals are compared with replica codes for each satellite available at the receiver. The receiver, or external positioning means, can either generate the respective C/A code sequence for a specific satellite with a code generator, or store the different C/A codes. Before performing the correlation, the received signals are down converted by a multiplication with an intermediate frequency. Then, the down converted signal is multiplied for the correlation with the replica of one of the codes. The receiver slides a replica of the respective code in time and repeats the multiplication. The result of the respective multiplication is integrated or low-pass filtered. As the code in a signal transmitted by a satellite and the receiver code line up completely, a correlation peak is reached at which the resulting value is the greatest. A channel of a received signal resulting in the correlation with a specific replica code in the highest peak is assumed to be the channel employed by the satellite for which this specific replica code is provided. A GPS receiver uses the detected signal power in the correlated signal to align the C/A code in the receiver with the code in the satellite signal.

The positioning is based on the one hand on C/A code related information, like the C/A code phase, and the number of chips received after the change of the last epoch, and on the other hand on the navigation information included in the signal.

In weak signal conditions, e.g. indoors, a GPS receiver may be able to detect the C/A code in signals, but not to demodulate the included navigation data. Usually, missing navigation data is the key element why positioning cannot be maintained or initiated in weak signal condition for a long period. The receiver thus requires in such conditions assistance for performing a positioning. In case the receiver functions at the same time as mobile terminal, such an assistance may consist in ephemeris data provided over a cellular network to the receiver.

A more sophisticated form of assisting the receiver which also supports the detection of C/A codes is a delivery of the exact GPS time. Exact time is needed e.g. to improve the sensitivity of the receiver. In time recovery methods the accurate GPS time, i.e. the time of transmission of a satellite signal, is not known and is determined indirectly. However, time recovery methods need a reference position of some quality for calculating the accurate position in GPS. A reference position is a known position near to the expected location of the receiver and is needed for calculating approximated geometrical distances between satellites and the receiver. The calculated distances can then be used in the prediction of navigation data bit edges and C/A-code phases, in order to improve the sensitivity of the receiver and to speed up the signal acquisition. If a reference position is not available or if an available reference position is too far from the receiver, the possibilities of assisting the GPS hardware in acquisition and in tracking of C/A codes are decreased, and also the use of some time recovery methods are prohibited in the case that the time assistance is not exact. Time recovery methods have been presented for example in copending US patent applications by the same applicant.

A possibility for determining a reference position is also of particular interest for new GPS signals called L2C, which are presented for example in the documents "The Modernized L2 Civil Signal" in GPS World, September 2001, by Richard D. Fonata, Way Cheung, and Tom Stansell and "The New L2 Civil Signal" by Richard D. Fonata, Way Cheung, Paul M. Novak, and Tom Stansell. These L2C signals comprise a new pilot signal which does not have any data modulation. Therefore, it is not possible to decode the exact time from the satellite signals, if only these pilot signal is measured. In case there is no accurate time assistance from the network available either, the accurate time can only be obtained by the use of a time recovery method, for which a reference position is needed.

In case a receiver has in addition the functionality of a mobile terminal, a reference position can be provided in a network assistance message transmitted by a cellular network. It is assumed that the receiver receiving the assistance message is close to the base station transmitting the message, and that therefore the position of the base station can be used as reference position. For several reasons, such an assistance may not be available, though. Certain cellular networks, like the US CDMA, do not support sending reference position assistance. Operators of other cellular networks may not be willing to distribute information about their base station locations freely. Certain wireless networks, e.g. WLAN and Bluetooth™, are moreover not able to provide a reliable reference position, even though they support other GPS assistance messages. Finally, it is virtually impossible to inquire a reference position over carrier-independent protocols like WAP.

Instead of relying on a reference position from a network, it would be possible to store a reference position in a memory of the receiver, or to use a previously measured position as reference position. Both approaches have the disadvantage, however, that the current position of the receiver can deviate significantly from the stored or the previous location, which renders the information useless.

SUMMARY OF THE INVENTION

It is an object of the invention to improve the positioning of a receiver. It is in particular an object of the invention to provide a reliable reference position for a receiver.

This object is reached according to the invention with a method for positioning a receiver receiving code modulated signals transmitted by satellites and formed by an individual code for each satellite. It is proposed that in a first step of this method, a reference position for the receiver is calculated based on frequency measurements of the received code modulated signals In a second step, the determined reference position can then be employed for determining an accurate position of said receiver.

The object is also reached with positioning means, a receiver, a computing server and a positioning system which comprise means for realizing the proposed method.

The invention proceeds from the idea that frequency measurements for signals transmitted by satellites can be used for determining a reference position for a receiver. A position which is determined based on frequency measurements has a rather coarse accuracy. Therefore, it is not suited for an exact positioning. The accuracy is sufficient, however, for using such a reference position as initial position for a more accurate positioning based e.g. a time recovery method.

It is an advantage of the invention, that it offers for any kind of positioning system an independent determination of a reference position at the respective location of a receiver. In particular, the invention enables the determination of a reference position also in the case that a required reference position is not provided by a network. Even in the case that a reference position is provided by a network, it will usually be faster to determine the reference position for the receiver according to the invention.

The invention is of particular advantage in weak signal conditions, for example indoors, in which there is not sufficient information for determining the accurate position without a reference position.

Preferred embodiments of the invention become apparent from the subclaims.

Advantageously, the frequency measurements according to the invention are Doppler frequency measurements. Doppler frequency measurements are already enabled in every GPS receiver. It is known for example to determine the velocity of the receiver based on Doppler frequency measurements once the position of the receiver is determined. Thus, an implementation of the invention based on Doppler frequency measurements is widely applicable without changes in the hardware or in the low-level software of a GPS receiver.

The determination of the reference position based on Doppler frequency measurements can be carried out in any suitable way. Position calculations are described for example in "Global Positioning System: Theory and Applications", Vol. I, AIAA Inc., 1996, by Parkinson B. (ed.) and Spilker J. (ed.), and in "A Doppler Based Navigation Algorithm", in Proc. ION 2001 NATIONAL TECHNICAL MEETING, Jan. 22–24, 2001, Long Beach, USA, 9 p., by Ilir F. Progri, Jonathan Hill, and William R. Michalso, which are incorporated by reference herein. Moreover, in the old US Navy System the accurate position and the velocity of a receiver are determined directly from Doppler frequency measurements, not from pseudoranges. In this system, however, seven satellites are needed for determining the three components of velocity, the three components of the position (x, y, z) and the derivative of the clock error. Since seven satellites are not visible at every location on earth, this system can only be employed on deepsea and in situations when there is a clear view of the sky.

In a preferred embodiment of the invention, the velocity of the receiver is set to zero for determining the reference position based on frequency measurements. A velocity of zero is a good approximation in case the receiver is located indoors. But also in situations in which the receiver moves at high speed it is acceptable to assume a velocity of zero, since the reference position constitutes only an initial position and can be erroneous to a certain extend.

The invention can be employed in particular, though not exclusively, in GPS, for example for navigation, positioning, and time dissemination.

Preferably, but not necessarily, the invention is implemented in software. Thus, the means for carrying out the required processing can be given by one or more processors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
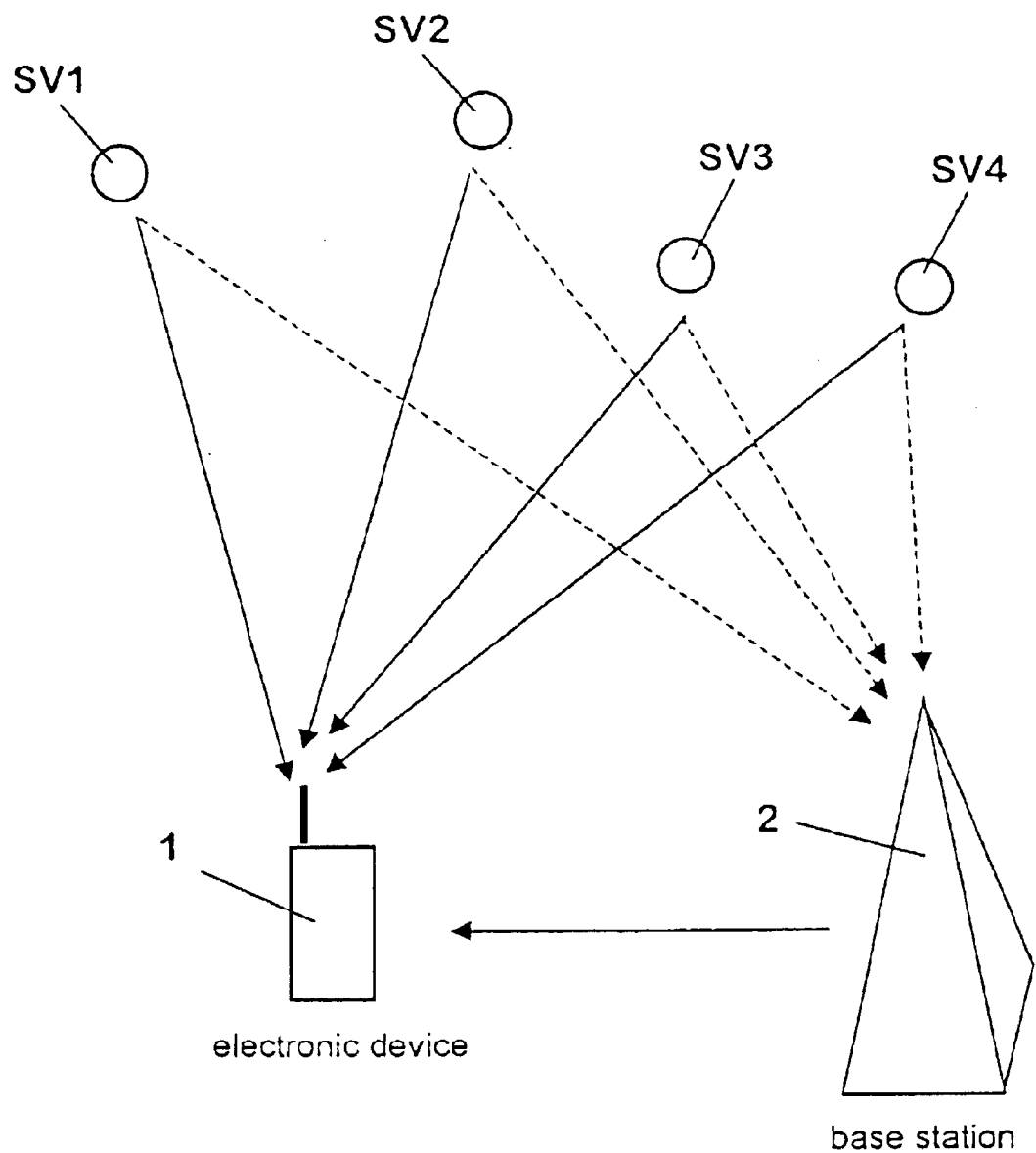
FIG. 1 schematically shows a constellation of an electronic device, a base station and GPS satellites.

FIG. 1 schematically shows a situation in which an electronic device 1 is to be positioned.

The electronic device 1 is located at a position at which it is able to receive signals from GPS satellites SV1–SV4, as indicated in the figure by arrows. The electronic device 1 comprises the functions of a GPS receiver and of a mobile phone. It is thus able to track and demodulate code modulated signals transmitted by GPS satellites, and to access a cellular network via a base station. Next to the electronic device 1, such a base station 2 of a cellular network is depicted. The cellular network is equally able to receiver the signals from the GPS satellites SV1–SV4 via its base stations 2, as indicated in the figure by arrows with dashed lines. The cellular network tracks and demodulates the received code modulated signals in order to retrieve the included navigation data. Furthermore, it transmits the ephemeris included in the navigation data of the demodulated signals and a rather accurate time reference to the electronic device 1.

Figure 2:
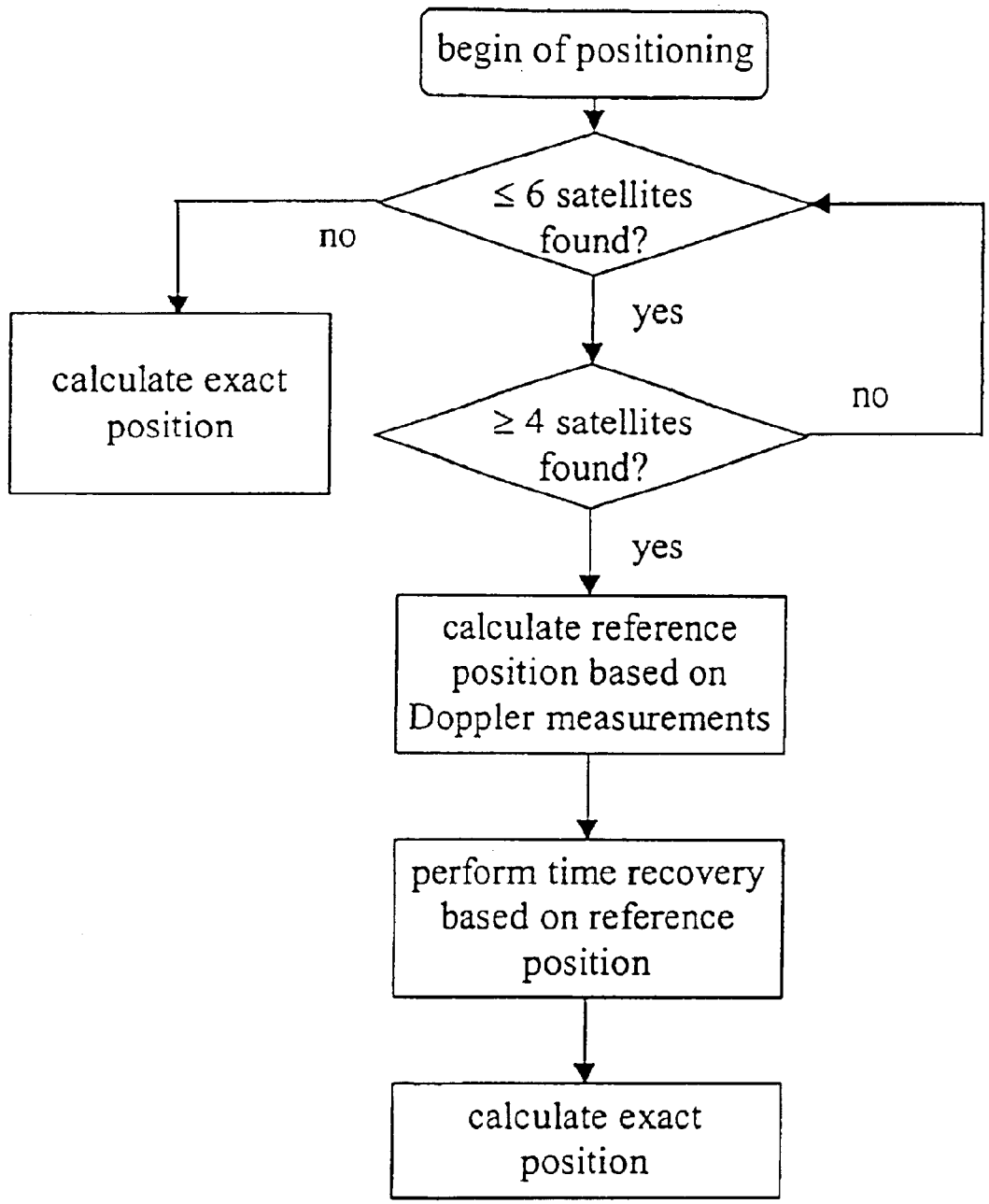
FIG. 2 is a flow chart illustrating an embodiment of the method according to the invention.

The flow chart of FIG. 2 now illustrates an embodiment of the method according to the invention which is implemented in the electronic device 1 for determining its position.

In a first step, the electronic device 1 determines from how many satellites SV1–SV4 it can detect a code-modulated signal by performing a correlation procedure. The number of satellites can be obtained for instance from ephemeris assistance obtained by the network. The network will send ephemeris data to the electronic device 1 only for those satellites SV1–SV4 that are visible to the transmitting base station 2. Due to the proximity of this base station 2 to the electronic device 1, the same satellites are visible to the electronic device 1.

In case code modulated signals from more that six satellites SV1–SV4 with a suitable geometry can be acquired within a predetermined time, the electronic device 1 calculates its position, its velocity and its clock drift based on the received signals and based on the navigation data received from the cellular network. The position of the electronic device 1 can be calculated with any suitable method, for example with the least square method used in C/A-code based positioning. Known position calculations are described e.g. in the above cited document by Parkinson or in "Understanding GPS: Principles and Applications", Artech House Inc., 1996, by Kaplan E. D. (ed.).

In weak signal conditions the electronic device 1 may not be able to acquire signals from more than six satellites in a reasonable time. While signals from four satellites are required to determine all coordinates of the position of a receiver and the time of a receiver, with the signals from less than six satellites it might nevertheless not be possible to determine an accurate position and time. The reason is that four satellites of which signals are acquired may be distributed with a geometry which is not suitable for determining the position of the receiver. A good constellation of satellites is only given if, seen from the receiver, they are located in clearly different directions.

Therefore, in case signals of between four and six satellites are received at the electronic device 1, the electronic device 1 first calculates a reference position and a clock drift based on Doppler frequency measurements, which calculations are known as such e.g. from the above cited documents by Parkinson and Progri. The velocity of the electronic device 1 is assumed to be zero for the calculations.

Once the reference position has been determined, it can be used for instance as initial position for a GPS time recovery method. The reference position is thus employed for estimating the geometrical distances between the satellites SV1–SV4 and the electronic device 1, which is supposed to be very similar to the geometrical distances between the satellites SV1–SV4 and the base station 2. The calculated distances are then used together with the exact time reference provided by the network for predicting navigation data bit edges and C/A-code phases. Thereby, the sensitivity of the receiver is improved and the signal acquisition can be accelerated. Thus it is probable that it becomes possible to acquire signals from more than six satellites in a reasonable time. Since the cellular network provides the electronic device 1 in addition via the base station 2 with the ephemeris data of the satellites SV1–SV4, the electronic device 1 is able to determine its position even if it is only able to detect the signals and to determine the C/A code phase, but not to demodulate the signals.

In case signals of less than four satellites are acquired within a reasonable time, the electronic device 1 waits for further signals and starts anew with the first step.

It is not required that an electronic device 1 comprises the intelligence for determining its position itself. Alternatively, an electronic device could comprise means for communicating with external positioning means to which it forwards received signals and/or measurement results and which positioning means perform all or some of the required calculations. Such external positioning means could be integrated in particular in the cellular network, with which the electronic device 1 communicates via the base station 2.

Thus, while there have been described fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for positioning a receiver receiving code modulated signals transmitted by satellites and formed by an individual code for each satellite, wherein in a first step, a reference position for said receiver is calculated based on at least three frequency measurements of said code modulated signals, which reference position is employed in a second step for determining an accurate position of said receiver, wherein at least three measurements enabling the calculation of pseudoranges are used in said second step.

2. The method according to claim 1, wherein said frequency measurements are Doppler frequency measurements.

3. The method according to claim 1, wherein said calculated reference position is employed in a time recovery method, which time recovery method provides assistance information for determining said accurate position of said receiver.

4. The method according to claim 1, wherein for calculating said reference position based on frequency measurements, the velocity of said receiver is assumed to be zero.

5. The method according to claim 1, wherein said reference position is determined in case there are signals from 4 to 6 satellites available at said receiver.

6. The method according to claim 1, wherein said satellites are GPS satellites and wherein said receiver is a GPS receiver.

7. Positioning means for positioning a receiver based on code modulated signals transmitted by satellites and formed by an individual code for each satellite, wherein results of frequency measurements on said code modulated signals are provided to said positioning means by receiving means of said receiver, and wherein said positioning means comprises:

means for calculating a reference position for said receiver based on said results of at least three of said frequency measurements; and means for determining an exact position of said receiver based on said calculated reference position using at least three measurements enabling the calculation of pseudoranges.

8. The positioning means according to claim 7, wherein said positioning means are integrated in a GPS receiver.

9. The positioning means according to claim 7, wherein said positioning means are integrated in a computing server to which at least one GPS receiver has access.

10. Receiver comprising receiving means for receiving code modulated signals transmitted by satellites and formed by an individual code for each satellite, and comprising positioning means with:

means for carrying out at least three frequency measurements on the received code modulated signals;

means for calculating a reference position for said receiver based on said frequency measurements; and means for determining an exact position of said receiver based on said calculated reference position using at least three measurements enabling the calculation of pseudoranges.

11. The receiver according to claim 10, wherein said receiver is a GPS receiver.

12. Computing server for positioning a receiver, comprising at least means for receiving via said receiver results of frequency measurements on code modulated signals transmitted by satellites and formed by an individual code for each satellite, and positioning means with:

means for calculating a reference position for said receiver based on at least three of said frequency measurements; and means for determining an exact position of said receiver based on said calculated reference position using at least three measurements enabling the calculation of pseudoranges.

13. The computing server according to claim 12, wherein said computing server provides access for at least one GPS receiver.

14. Positioning system comprising at least one receiver with receiving means for receiving code modulated signals transmitted by satellites and formed by an individual code for each satellite and with means for performing frequency measurements on said received code modulated signals, and further comprising at least one computing server with positioning means including:

means for calculating a reference position for said receiver based on at least three of said frequency measurements; and means for determining an exact position of said receiver based on said calculated reference position using at least three measurements enabling the calculation of pseudoranges.

15. The positioning system according to claim 14, wherein said at least one receiver is a GPS receiver receiving signals from GPS satellites.

* * * * *